United States Patent
Moutinho et al.

(10) Patent No.: US 9,902,837 B2
(45) Date of Patent: Feb. 27, 2018

(54) OIL EXTENDED FUNCTIONALIZED STYRENE-BUTADIENE COPOLYMER

(71) Applicants: LANXESS Deutschland GmbH, Cologne (DE); LANXESS Elastomeros do Brasil S.A., Duque de Caxias, Campos Eliseos (BR)

(72) Inventors: Marcus Tadeus de Moura Moutinho, Rio de Janeiro (BR); Manoel Remigio Dos Santos, Duque de Caxias-RJ (BR); Dave Hardy, Leiderdorp (NL)

(73) Assignees: ARLANXEO Deutschland GmbH, Dormagen (DE); ARLANXEO Brasil S.A., Rio de Janeiro (BR)

( * ) Notice: Subject to any disclaimer, the term of this patent is extended or adjusted under 35 U.S.C. 154(b) by 0 days.

(21) Appl. No.: 14/785,002

(22) PCT Filed: Apr. 16, 2014

(86) PCT No.: PCT/EP2014/057693
§ 371 (c)(1),
(2) Date: Oct. 16, 2015

(87) PCT Pub. No.: WO2014/170356
PCT Pub. Date: Oct. 23, 2014

(65) Prior Publication Data
US 2016/0068659 A1    Mar. 10, 2016

(30) Foreign Application Priority Data

Apr. 18, 2013 (EP) .................................... 13164219

(51) Int. Cl.
| | | |
|---|---|---|
| C08F 2/32 | (2006.01) | |
| C08K 5/1515 | (2006.01) | |
| C08C 19/28 | (2006.01) | |
| C08C 19/44 | (2006.01) | |
| C08F 257/02 | (2006.01) | |
| C08F 279/02 | (2006.01) | |
| C08K 3/04 | (2006.01) | |
| C08K 3/36 | (2006.01) | |
| C08K 5/01 | (2006.01) | |
| C08K 5/11 | (2006.01) | |
| C08F 236/10 | (2006.01) | |
| C08F 2/22 | (2006.01) | |

(52) U.S. Cl.
CPC ............ *C08K 5/1515* (2013.01); *C08C 19/28* (2013.01); *C08C 19/44* (2013.01); *C08F 2/22* (2013.01); *C08F 2/32* (2013.01); *C08F 236/10* (2013.01); *C08F 257/02* (2013.01); *C08F 279/02* (2013.01); *C08K 3/04* (2013.01); *C08K 3/36* (2013.01); *C08K 5/01* (2013.01); *C08K 5/11* (2013.01); *C08K 3/045* (2017.05)

(58) Field of Classification Search
None
See application file for complete search history.

(56) References Cited

U.S. PATENT DOCUMENTS

| | | |
|---|---|---|
| 4,574,140 A | 3/1986 | Sandstrom et al. |
| 6,455,655 B1 | 9/2002 | Colvin et al. |
| 6,512,053 B1 | 1/2003 | Colvin et al. |
| 6,653,404 B2 | 11/2003 | Konno et al. |
| 6,699,935 B2 | 3/2004 | Akema et al. |
| 6,716,925 B2 | 4/2004 | Thielen et al. |
| 7,108,033 B2 | 9/2006 | Dalphond et al. |
| 9,394,426 B2 | 7/2016 | Bastioli et al. |
| 9,478,047 B2 | 11/2016 | Kondo |
| 2002/0045691 A1* | 4/2002 | Konno .................. C08F 236/12 524/265 |
| 2011/0098404 A1 | 4/2011 | Kwag et al. |
| 2011/0215632 A1 | 9/2011 | Gleyal |
| 2012/0065324 A1* | 3/2012 | Sakaki ...................... C08C 1/14 524/575.5 |

FOREIGN PATENT DOCUMENTS

| | | |
|---|---|---|
| JP | 2002097309 A2 | 4/2002 |
| JP | 2003238739 A2 | 8/2003 |
| JP | 2007051206 A2 | 3/2007 |
| JP | 2007262197 A2 | 10/2007 |
| JP | 2008189880 A2 | 8/2008 |
| JP | 2012072338 A2 | 4/2012 |
| KR | 20030092744 A | 12/2003 |

OTHER PUBLICATIONS

Sahakaro, (2011) Epoxidized Natural Oils as the Alternative Safe Process Oils in Rubber Compounds. Rubber Chemistry and Technology: Jun. 2011, vol. 84, No. 2, pp. 200-214.*
Freedman, JAOCS, vol. 61, No. 10 (Oct. 1984), p. 1638-1643. (Year: 1984).*
IPOS (Singapore), Written Opinion dated Oct. 21, 2016, six pages.
European Search Report from European Application No. 13164219, dated Sep. 30, 2013, two pages.

* cited by examiner

*Primary Examiner* — Robert C Boyle

(57) ABSTRACT

The present invention refers to an oil extended functionalized styrene-butadiene copolymer wherein the functionalized styrene-butadiene copolymer comprises 15 to 50 wt. %, based on 100 wt. % of the copolymer, of repeating units based on styrene, 42 to 80 wt. %, based on 100 wt. % of the copolymer, of repeating units based on butadiene, and 5 to 43 wt. %, based on 100 wt. % of the copolymer, of units based on at least one functional monomer and wherein at least one extender oil is based on vegetable oils, preferably epoxidized vegetable oil.

17 Claims, No Drawings

OIL EXTENDED FUNCTIONALIZED STYRENE-BUTADIENE COPOLYMER

The present invention refers to an oil extended functionalized styrene-butadiene copolymer, a process for it and its use.

BACKGROUND OF THE INVENTION

Numerous studies have been performed consisting in modifying the nature of diene polymers and copolymers through functionalizing agents.

A functional ESBR with glycidyl methacrylate (GMA) is described in U.S. patent application No. 2011/0098404 A1. According to the inventors "Copolymer of styrene-butadiene obtained by emulsion polymerization presents poor compatibility with silica". In this patent application, inventors reported the development of a functional styrene-butadiene copolymer by emulsion polymerization with improved silica compatibility by polymerizing styrene-butadiene copolymer using an epoxy acrylate monomer and then performing ring-opening of the epoxy group with 20% aqueous solution of sulfuric acid ($H_2SO_4$) or potassium hydroxide (KOH). This functional ESBR was used in compound preparation with silica, which is said to have superior tensile property, wear resistance and wet stopping (tan delta at 0° C.). This patent application claims a functional styrene-butadiene copolymer with monomers having functional groups like amine, hydroxyl, alkoxy, sulfonate, carboxylate, phosphonate, halogen, thiol and azide; a silica composite for tire; hoses or belts and a method for preparing said functional styrene-butadiene copolymer which comprises performing a ring-opening the epoxy.

A rubber that produces a vulcanizate with low rolling resistance, good wet skid and improved wear resistance for automobile tire treads is described in U.S. Pat. No. 6,699,935 B2. The inventors used polymerizable unsaturated groups such as divinylbenzene, carboxylic, hydroxyl and/or epoxy groups. In this Patent it is reported that rolling resistance can be reduced by lowering hysteresis loss of the vulcanized rubber (low heat release). Tires treads which use inorganic fillers like silica show low rolling resistance and excellent driving stability (wet skid). On the other hand, they exhibit poor tensile strength and wear resistance. The reason is believed to be the poor interaction polymer-silica compared to carbon black. In order to overcome this problem, it has been proposed to obtain a polymer with functional group that can be able to interact with inorganic fillers (silica). However, due to strong interaction that these groups promote with polymer, it creates problems of filler dispersion, heat release during processing and poor processability. Researchers' challenge is to find the appropriate amount of functional monomer incorporated in the polymer that can combine properties with processability. U.S. Pat. No. 6,699,935 B2 claims a rubber composition having polymerizable monomer with functional group comprising carboxylic, amino, hydroxyl, epoxy and alkoxysilyl groups. Examples of carboxylic groups: (meth)acrylic acid, maleic acid, itaconic acid and the like. Examples of amino groups: dimethylaminomethyl(meth)acrylate, diethylaminomethyl (meth)acrylate, N,N-diethyl-p-aminostyrene, 2-vinylpyridine and the like. Examples of hydroxy groups: 2-hydroxyethyl(meth)acrylate, 3-hydroxypropyl(meth)acrylate, 2-hydroxybutyl(meth)acrylate, p-hydroxystyrene and the like. Examples of epoxy groups: (meth)allyglycidylether, glycidyl(meth)acrylate and 3,4-oxycyclohexyl(meth)acrylate. Examples of alkoxysilane groups: (meth)acryloxymethyltrimethoxy silane, (meth)acryloxymethyldimethoxy silane, gamma-methacryloxypropyl tripropoxysilane and the like. It is mentioned in this invention that is possible to have a combination of two or more functional monomers having carboxylic, hydroxyl or epoxy groups. For example, it is possible to have a combination of a carboxylic group monomer and a hydroxyl group monomer. U.S. Pat. No. 6,699,935 also claims a tire composition with mentioned functional polymers.

U.S. Pat. No. 4,574,140 discloses a process for obtaining a synthetic elastomer copolymer with improved "green strength", defined in the invention as "a property of a polymer or elastomer common in natural rubber, which contributes to the proper building conditions, generally measured by stress-strain measurements". The process for obtaining such polymers was emulsion polymerization by free radicals utilizing conventional practices and procedures, such as temperature, pressure and time through free radical initiators. Emulsion polymerization was performed at pH from 10 to 11, although authors state that it should not be limiting. These polymers with pendant hydroxyl groups can be blended in Banbury with another copolymers like natural rubber, cis and trans polybutadiene, both cis and trans polyisoprene, polypropylene, a copolymer of butadiene and styrene, a copolymer of alpha-methylstyrene and butadiene, high cis-1,4-polyisoprene and high cis-1,4-polybutadiene. The blending can be performed by the form of latex and can be mixed with a latex of an elastomer such as polybutadiene, a copolymer of styrene and butadiene and nitrile latex. The terpolymer can be partially crosslinked by the addition of crosslinking agents such as diisocyanates. Examples of monomers used to functionalize the polymer are: hydroxy propyl methacrylate, hydroxy ethyl methacrylate, hydroxy ethyl acrylate and hydroxy propyl acrylate. Example 3 of this invention shows terpolymers of styrene-butadiene-HEMA (hydroxyl ethyl methacrylate) and styrene-butadiene with glycidyl methacrylate (GMA). The latexes were stripped, coagulated and compounded using carbon black in the recipe. According to the inventors, HEMA terpolymer compounds exhibited better resilience than compounds of GMA terpolymer. This patent claims a process for forming a synthetic elastomer copolymer having improved green strength comprising reacting at least one type of a synthetic elastomer forming monomer with a hydroxyl group wherein said hydroxyl containing monomer is selected from the group consisting of hydroxyethyl methacrylate, hydroxy propyl methacrylate, hydroxyethyl acrylate and hydroxy propyl acrylate.

U.S. Pat. No. 6,653,404 B2 describes a process for obtaining a rubber with functional monomers like diethylaminomethyl(meth)acrylate, hydroxypropyl(meth)acrylate, o,m,p-hydroxystyrene, glycidyl(metha)crylate, alkoxysilyl groups (meth)acryloxymethyltrimethoxy silane and the like. According to this invention, a rubber composition presents satisfactory processability with silica. Rubber composition with silica and carbon black is said to have excellent tensile strength and wearing resistance.

U.S. Pat. No. 7,108,033 B2 discloses an invention for obtaining polymers that exhibits low hysteresis and good compatibility with fillers, like carbon black and silica. Functional monomers are derived from one or more conjugated diolefin monomers with a leaving group, such as halogen (chlorine, bromine and iodine). According to the inventors, the polymerization system can be carried out by bulk polymerization, vapor phase polymerization, solution polymerization, suspension and emulsion polymerization, but emulsion polymerization is the commercially preferred one. Examples of these monomers are: 4-vinylbenzyl chloride, 4-vinylbenzyl bromide, 4-vinylbenzyl thiocyanate. Functional polymers were compounded using in the recipe carbon black and silica. Dynamic tests shown that compounds from functional polymer with 4-vinylbenzyl chloride exhibited hysteresis reduction, what is an indication of improvement in polymer-filler interaction, mainly with silica. This patent claims a tire which is comprised of a generally toroidal-shaped carcass with an outer circumferential tread and a rubbery composition with the mentioned functional monomers.

U.S. Pat. No. 6,455,655 B1, U.S. Pat. No. 6,512,053 B1 and U.S. Pat. No. 6,716,925 B2 disclose an emulsion styrene-butadiene rubber (ESBR) with properties like rolling resistance and tread wear similar to those of solution SBR but with improved traction characteristics when employed in formulations for tire tread. This rubber is characterized by the incorporation of a hydroxy alkyl acrylate monomer in the polymer chain, more specifically hydroxypropylmethacrylate. In U.S. Pat. No. 6,455,655 B1 and U.S. Pat. No. 6,512,053 B1, lattices with low and high molecular weight are produced separately. In U.S. Pat. No. 6,455,655 B1, hydroxypropylmethacrylate monomer is preferably incorporated during polymerization for attaining the high molecular weight rubber and its level ranges from about 3 weight percent to about 5 weight percent. The polymerization temperature ranges from 7° C. to 13° C. Latex with high molecular weight and with low molecular weight are blended and coagulated with brine and dilute sulfuric acid or aluminum sulfate. Crumbs were washed and dried. In order to obtain desired characteristics, emulsion SBR of this invention can be blended with other polymers and co-cured. Examples of such polymers include natural rubber, high cis-1,4-polybutadiene, high vinyl polybutadiene, medium vinyl polybutadiene, high trans-1,4-polybutadiene, solution styrene-butadiene, styrene-isoprene-butadiene, styrene-isoprene, isoprene-butadiene and 3,4-polyisoprene. U.S. Pat. No. 6,455,655 B1 claims a styrene-butadiene rubber composition wherein the hydroxy alkyl acrylate, specifically hydroxypropylmethacrylate, is bound in the polymer at a level that ranges from about 3 percent to about 5 percent and a tire having a tread that is comprised of the styrene-butadiene rubber composition specified in the invention wherein the filler is selected from the group consisting of carbon black and silica.

It is well known in the state of the art that ESBR polymers exhibit their better performance in terms of rolling resistance, tear resistance and wear resistance when produced with high molecular weight. However, those high molecular weight polymers are difficult to process in blending equipments generally used in the rubber compounding industry.

To overcome this technical problem it is a general practice in the synthetic rubber production plants to incorporate extension oils to the high molecular weight polymers in order to improve their processability in rubber compounding plants.

The state of art documents described above and general technical literature do not comment the role of extension oils in the properties or processability of polar modified ESBR. They are mainly centered on polar functionalization agents introduced in polymer chain without taking care of the chemical nature of the extension oil to be used.

Extension oils for ESBR are key components for dictating their compatibility, processability and properties. For this reason, it is very important that extension oils are chemically compatible to the polymer backbone and filler used for compounding.

Extension oils currently used in ESBR production are from fossil origin and based on non-polar fractions of petroleum hydrocarbons having a certain composition of aromatic, naphthenic and paraffinic compounds.

Aromatic compounds are more compatible to ESBR polymer chains than naphthenic and paraffinic compounds in this sequence. Regarding carbon black compatibility the same sequence is followed.

Nevertheless, oil fractions are richer in paraffinic compounds and for this reason it is very important to control the level of aromatic and naphthenic carbons keeping a minimum amount of such compounds in extension oil used to ESBR modification.

Additionally, highly aromatic oils were recently banned from rubber industry due to its high content of PAH (Poly Aromatic Hydrocarbons). They were replaced by TRAE (Treated Residual Aromatic Extract), TDAE (Treated Distillate Aromatic Extract), MES (Mild Extraction Solvate), HN (High Naphthenic) and other low PAH oils. However, those oils still present some amount of PAH compounds and all of them are derived from non renewable sources coming from different processes of crude petroleum distillation.

SUMMARY OF THE INVENTION

The present invention discloses an oil extended functionalized styrene-butadiene copolymer wherein the functionalized styrene-butadiene copolymer comprises 15 to 50 wt. %, based on 100 wt. % of the copolymer, of repeating units based on styrene, 42 to 80 wt. %, based on 100 wt. % of the copolymer, of repeating units based on butadiene, and 5 to 43 wt. %, based on 100 wt. % of the copolymer, of units based on at least one functional monomer and wherein at least one extender oil is based on vegetable oils.

Preferably, the functional monomer is polymerized with the styrene monomer and butadiene monomer to form the functionalized copolymer therefore representing a functionalized terpolymer.

Preferably, the oil extended functionalized styrene-butadiene copolymer comprises 0.3 to 10 wt. %, preferably 0.5 to 5.0 wt. % and more preferably 0.7 to 3.5 wt. %, based on 100 wt. % of the copolymer, of units based on the functional monomer.

The oil extended functionalized styrene-butadiene copolymer has preferably a Mooney viscosity (ML 1+4 at 100° C.) of 35 to 65, preferably 40 to 60, and an average molecular weight (Mw) determined via GPC (Gel permeation Chromatography) of 100,000 to 2,200,000 g/mol, preferably 200,000 to 900,000 g/mol.

Preferably, the functional monomer is grafted to the copolymer.

Preferably, the functional monomer is selected from the group consisting of acrylate based monomers preferably glycidyl methacrylate, glycidyl acrylate, hydroxypropyl methacrylate, hydroxyethyl methacrylate, acrylonitrile, methacryloxypropyltrimethoxysilane, methacryloxypropyltriisopropoxysilane, or methacryloxysilane.

Preferably, the extender oil is selected from the group consisting of soybean, cottonseed, castorbean, palm, linseed, coconut, sunflower, pine, corn, olive, peanut, rapeseed, canola, sesame, rice bran, jatropha oils and mixtures thereof.

The extender oil is preferably transesterified, more preferably epoxidized.

In a preferred embodiment, the extender oil is used in an amount of 25 to 42 phr, preferably 37.5 phr.

The present invention discloses a process for introducing a polar co-monomer in ESBR polymer containing an epoxide group which is kept stable without ring opening during polymerization and thus showing an excellent processability with silica compounds.

Preferably, the process for producing the oil extended functionalized styrene-butadiene copolymer comprises:

(1a) emulsion polymerization of styrene, butadiene and a functional monomer using a buffering system and controlling the pH of the latex in the range of 8.5 to 9.5 wherein the buffering system is selected from the group consisting of disodium hydrogen phthalate/sodium dihydrogen orthophosphate, acetic acid/sodium acetate, boric acid/sodium tetraborate, sodium phosphate disubstituted/sodium hydroxide, monosodium phosphate/phosphoric acid, potassium dihydrogen orthophosphate/sodium hydroxide, disodium phosphate/phosphoric acid, monosodium phosphate/sodium hydroxide, boric acid/sodium hydroxide, dipotassium hydrogen phthalate/potassium dihydrogen orthophosphate, potassium dihydrogen orthophosphate/sodium hydroxide, sodium tetraborate/hydrochloric acid, sodium carbonate/sodium hydrogen carbonate, disodium phosphate/phosphoric acid, potassium phosphate/potassium hydroxide, sodium tetraborate/sodium hydroxide, sodium bicarbonate/sodium hydroxide, sodium hydrogen orthophosphate/sodium hydroxide, potassium chloride/sodium hydroxide, or (1b) grafting a styrene-butadiene copolymer obtained by emulsion polymerization of styrene and butadiene with a functional monomer, and (2) blending such copolymer obtained by (1a) or (1b) with at least one extender oil based on vegetable oils.

Preferably, the functional monomer using for said process is selected from the group consisting of acrylate based monomers such as glycidyl methacrylate, glycidyl acrylate and the like, hydroxypropyl methacrylate, hydroxyethyl methacrylate and the like, acrylonitrile, methacryloxypropyltrimethoxysilane, methacryloxypropyltriisopropoxysilane, methacryloxysilane and the like.

Preferably, the extender oil using for said process is selected from the group consisting of soybean, cottonseed, castorbean, palm, linseed, coconut, sunflower, pine, corn, olive, peanut, rapeseed, canola, sesame, rice bran, jatropha or mixtures thereof.

In a preferred embodiment, the extender oil for said process is transesterified having a mixture of fatty add ethyl ester from 5 to 60 wt. %, diglyceride from 40 to 80 wt. % and triglyceride from 0.01 to 99.9 wt. %, preferably resulting in the composition consisting of fatty acid ethyl ester varying from 35 to 48%, diglyceride varying from 50 to 75% and triglyceride varying from 0.01 to 50% and more preferably resulting in the composition consisting of fatty acid ethyl ester varying from 40 to 44%, diglyceride varying from 56 to 60% and triglyceride varying from 0.01 to 4%, based on 100 wt. % of the mixture.

In another preferred embodiment, the transesterified extender oil is epoxidized having a degree of epoxidation of 2.5 to 4.5% and preferable of 3.3 to 3.5%.

The present invention also discloses the use of epoxidized renewable extension oils which are compatible with the epoxidized ESBR described above and impart excellent properties such as rolling resistance, wet grip, wear resistance and tear strength to compounds prepared with silica and/or carbon black as filler.

Another invention is also a rubber composition comprising the inventive oil extended functionalized styrene-butadiene and at least one carbon black and/or at least one silica.

Preferably, the present invention also comprises the use of the rubber composition for the production of technical articles, preferably tires, treads, conveyor belts, shoe soles, piping, carpets, hoses and mouldings.

In the present application the term "renewable" means non fossil origin oil including all the vegetable oil mentioned in the application, which are selected from soybean, cottonseed, castorbean, palm, linseed, coconut, sunflower, pine, corn, olive, peanut, rapeseed, canola, sesame, rice bran, jatropha or mixtures thereof, preferably soybean, cottonseed, castorbean, palm and linseed oils, preferably soybean and cottonseed oils and more preferably soybean oil.

Rubber obtained using standard ESBR extended with common soybean oil was used to prepare compounds with silica and/or carbon black as filler, but mechanical properties and wear resistance of vulcanizates were very poor showing oil exudation due to the low interaction polymer-oil.

This technical problem was overcome after functionalizing both polymer and renewable extension oil. Thus, the present invention proposes obtaining functionalized latex having epoxide groups along the polymeric chain and then incorporation of esterified and epoxidized renewable oil, preferably epoxidized soybean oil.

Rubber compounds with silica and/or carbon black prepared using the new rubber of the present invention presented improved properties compared to the standard rubber extended with common soybean oil.

This new rubber developed in this invention presents no oil exudation and imparts excellent and superior properties to the rubber vulcanizates obtained thereon due to proper compatibility of polymer and extension oil.

Therefore, the present invention refers to a process for producing oil extended functionalized styrene-butadiene copolymer by emulsion polymerization comprising the following steps:

(1a) emulsion polymerization of styrene, butadiene and a functional monomer using a buffering system and controlling the pH of the latex pH in the range of 8.5 to 9.5, in order to preserve the epoxide group stable and without ring opening; and (2) blending such copolymer obtained by (1a) with at least one extender oil based on vegetable oils, preferably epoxidized vegetable oil.

In a preferred embodiment, the present invention refers to a process for producing oil extended functionalized styrene-butadiene copolymer by emulsion polymerization comprising the following steps:

(1b) direct functionalization of the polymer chain through the modification of a common ESBR by functionalizing its polymeric chain with epoxide groups; and (2) blending such copolymer obtained by (1b) with at least one extender oil based on vegetable oils, preferably epoxidized vegetable oil.

In a preferred embodiment, the present invention refers to an oil extended functionalized styrene-butadiene copolymer, wherein the styrene monomer is present in an amount of 15 to 50% by weight (wt. %), based on 100 wt. % of the copolymer, the butadiene monomer is present in an amount of 42 to 80% by weight, based on 100 wt. % of the copolymer, the extender oil is present in an amount of 25 to 42 phr, more preferably 37.5 phr.

Preferably oil extended functionalized styrene-butadiene copolymer presents a Mooney viscosity (ML 1+4, 100° C.) of 35 to 65, preferably 40 to 60, and an average molecular weight (Mw) determined via GPC (Gel permeation Chromatography) of 100,000 to 2,200,000 g/mol, preferably 200,000 to 900,000 g/mol.

In a preferred embodiment, the present invention refers to a rubber composition comprising carbon black and/or silica as fillers and oil extended functionalized styrene-butadiene as described above, preferably obtainable through the process of the present invention.

In a preferred embodiment, the present invention refers to the use of the rubber composition comprising carbon black and/or silica as fillers and oil extended functionalized styrene-butadiene copolymer for manufacturing technical articles, such as tires, treads, conveyor belts, shoe soles, piping, carpets, hoses and molded products in general.

In a preferred embodiment, the present invention refers to the use of an oil extended functionalized styrene-butadiene copolymer for manufacturing rubber composition comprising carbon black and/or silica as fillers.

In a preferred embodiment, the present invention refers to the use of renewable oil for producing oil extended functionalized styrene-butadiene copolymer by emulsion polymerization.

In a preferred embodiment, the present invention refers to oil extended functionalized styrene-butadiene copolymer obtainable through the process of the present invention.

DETAILED DESCRIPTION OF THE INVENTION

Polymers having functional groups present improved interaction with fillers, mainly silica that also have functional groups (hydroxyl and siloxane groups). The better the interaction polymer-filler the lower the hysteresis loss of the vulcanized compound (low heat dissipation) and, consequently, reduced rolling resistance, what means fuel consumption economy.

It is known that silica as reinforcing filler provides improved mechanical properties, rolling resistance and others to the tire compared to carbon black.

Functionalized ESBR of the present invention can be produced by radical emulsion polymerization using monomers styrene, butadiene and a functional monomer having functional groups like epoxy, hydroxyl, etc. Styrene monomer is present in the polymeric chain in an amount of 15 to 50% by weight, preferably 20 to 40% by weight. Amount of styrene in the polymeric chain less than 15% by weight implies loss of properties, like mechanical properties and the like. Amount of styrene above 50% by weight will compromise rubber elasticity, wear resistance and also processability. Butadiene monomer is present in the polymeric chain in an amount of 42 to 80% by weight, preferably 45 to 75% by weight. Amount of butadiene in the polymeric chain less than 42% by weight implies poor wear resistance of a vulcanized rubber and the like. Amount of butadiene higher than 80% leads to a reduction in mechanical properties and the like.

Functionalized ESBR of the present invention presents an average molecular weight (Mw) by GPC (Gel permeation Chromatography) of 100,000 to 2,200,000 g/mol, preferably of 200,000 to 900,000 g/mol.

Functionalized ESBR of the present invention can be prepared using different polymerizable functional monomers as the third monomer, usually in small amount in order not to compromise processability. The polymerizable functional monomers of the present invention must have polar groups. As examples of polymerizable functional monomers suitable for the present invention are epoxy acrylate monomers such as glycidyl methacrylate, glycidyl acrylate and the like, hydroxypropyl methacrylate, hydroxyethyl methacrylate and the like, acrylonitrile, methacryloxypropyltrimethoxysilane, methacryloxypropyltrisopropoxysilane, vinyltrimethoxysilane, methacryloxysilane and the like.

Epoxy acrylate monomers are preferred and more preferably is glycidyl methacrylate (GMA).

The glycidyl methacrylate is present in the polymer chain in an amount of 0.3 to 10%, preferably in an amount of 0.5 to 5.0% and more preferably in an amount of 0.7 to 3.5% by weight in relation to the total monomers.

Glycidyl methacrylate monomer is represented by the Chemical Structure 1 below:

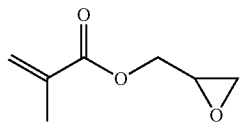

Glycidyl methacrylate is incorporated randomly along the polymeric chain during the polymerization reaction, obtaining a functionalized ESBR having epoxide groups (Chemical Structure 2). These polar groups improve interaction among polymer, filler and also the epoxidized vegetable oil, avoiding exudation on the vulcanized compound with silica and/or carbon black as filler.

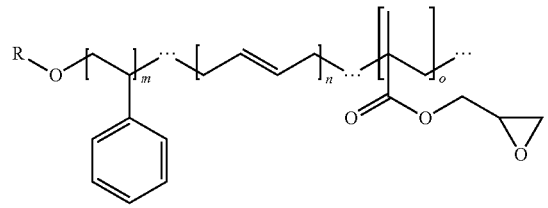

It is also possible to perform direct functionalization of the polymeric chain through the modification of common ESBR latex by functionalizing its polymeric chain with epoxide groups. Epoxidation of common latex is a well known process and can be performed with organic peracids, preferably perbenzoic and meta-chloroperbenzoic acids; peroxides and hydroperoxides, preferably benzoyl peroxide; performic and peracetic acids generated in situ by the addition of formic and acetic acids respectively and hydrogen peroxide in the reaction medium. Emulsion of epoxidized renewable oil of the present invention can be mixed with epoxidized latex obtained through the techniques above and coagulated obtaining an epoxidized rubber extended with functionalized renewable oil.

Epoxidation of natural rubber latex is also a well known process and commonly is performed through performic acid which is generated in situ by the addition of formic acid and hydrogen peroxide in the latex, producing the epoxidized latex.

Emulsion of epoxidized renewable oil of the present invention can be mixed with epoxidized natural rubber latex and coagulated obtaining an epoxidized natural rubber extended with functionalized renewable oil.

In order to have a better processability with silica, the polymer of this invention was obtained preserving the original structure of GMA monomer, that is, not allowing opening of the epoxide ring. The advantage of keeping the epoxide ring unchanged or stable is the improved processability of polymer obtained by this route in comparison to those where hydroxyl groups are formed through ring opening step in the polymer chain. The polymer backbone presenting hydroxyl groups have very strong interaction with silica hydroxyl groups due to the strong hydrogen bounding imparting very poor processability to those compounds. Additional advantage of this invention is the fact that it does not involve the use of strong acids or bases, usually used in the step of opening the epoxide ring. Accordingly, the resulting product of this invention can be produced using conventional equipments currently used for ESBR production.

In order to preserve the epoxide ring, the process of functionalization of the polymeric chain of the present invention was performed through the use of a buffering system which allowed the control of latex pH in the range of 8.5 to 9.5. Examples of buffering systems are disodium hydrogen phthalate/sodium dihydrogen orthophosphate, acetic acid/sodium acetate, boric acid/sodium tetraborate, sodium phosphate disubstituted/sodium hydroxide, monosodium phosphate/phosphoric acid, potassium dihydrogen orthophosphate/sodium hydroxide, disodium phosphate/phosphoric acid, monosodium phosphate/sodium hydroxide, boric acid/sodium hydroxide, dipotassium hydrogen phthalate/potassium dihydrogen orthophosphate, potassium dihydrogen orthophosphate/sodium hydroxide, sodium tetraborate/hydrochloric acid, sodium carbonate/sodium hydrogen carbonate, disodium phosphate/phosphoric acid, potassium phosphate/potassium hydroxide, sodium tetraborate/sodium hydroxide, sodium bicarbonate/sodium hydroxide, sodium hydrogen orthophosphate/sodium hydroxide, potassium chloride/sodium hydroxide.

Buffering system used in the present invention to preserve epoxide group is preferably composed of phosphates and acetates. Preferred buffering systems with phosphates comprise monosodium phosphate/phosphoric acid, potassium dihydrogen orthophosphate/sodium hydroxide, potassium phosphate/potassium hydroxide, disodium phosphate/phosphoric acid, monosodium phosphate/sodium hydroxide, preferably with potassium phosphate/potassium hydroxide. Preferred buffering systems with acetates comprise acetic acid/sodium acetate, acetic acid/sodium hydroxide, acetic acid/potassium hydroxide, acetic acid/sodium phosphate, preferably with acetic acid and potassium hydroxide.

The presence of epoxide groups bound in the polymeric chain can be determined by Fourier Transform Infrared (FTIR) technique. To perform this analysis a PERKIN ELMER equipment model Spectrum One was used. The procedure consists of rubber dissolution in tetrahydrofuran and reprecipitation with ethanol twice in order to remove residual monomers present in the sample. Then, the rubber was dried at room temperature and under vacuum. FTIR analysis was carried out through a film of rubber deposited on a zinc selenate cell. Figures 1, 2 and 3 show FTIR spectrums of GMA monomer, Standard ESBR prepared in Example 1 and Functionalized ESBR prepared in Example 4, respectively. Figure 3 shows absorption band in 847 cm-1 indicating the presence of epoxy ring in the polymer backbone and no absorption in the region 3100-3300 cm-1 indicating that hydroxyl groups are not present in the polymer backbone, what means that no epoxide ring opening took place.

Rubbers for tire industry are usually extended with 37.5 phr (parts per hundred of rubber) of oil in order to facilitate processing and avoid super heating caused by friction between rubber, fillers and other ingredients of the compound formulation.

With the intention to have a renewable source of extension oil for rubber industry, common soybean oil was initially tested, but it was observed oil exudation on vulcanized compounds prepared with rubber extended with this oil (evaluated through compression set: vulcanized compound submitted at 75° C. under compression during 3 days). This exudation is due to the low interaction rubber-oil.

In order to overcome this technical problem, the present invention proposes the use of functionalized ESBR with polymerizable functional monomer, preferably GMA, and extended with functionalized renewable oil, preferably epoxidized soybean oil, in order to improve the interaction between polymer and oil, avoiding exudation and also improving rubber properties.

Soybean oil and vegetable oils in general are triglyceride molecules represented by generic Chemical Structure 3:

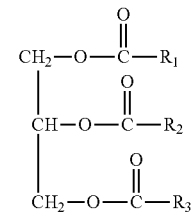

wherein $R_1$, $R_2$ and $R_3$ are radicals of esters from fatty acids. What characterizes different types of oils is the relative proportion of radicals $R_1$, $R_2$ and $R_3$ in their structure, according to Table 1:

TABLE 1

Composition of some vegetable oils:

| Type of oil | Composition (%) | | | |
| --- | --- | --- | --- | --- |
| | Saturated (palmitate/ stearate) | Mono- unsaturated (oleate) | Di- unsaturated (linoleate) | Tri- unsaturated (linolenate) |
| Soybean | 15 | 25 | 55 | 5 |
| Butter | 70 | 27 | 3 | 0 |
| Olive | 10 | 85 | 4 | 1 |
| Cotton | 20 | 30 | 50 | 0 |

Types of vegetable oils which can be used as extension oils for ESBR of the present invention comprise: soybean, cottonseed, castorbean, palm, linseed, coconut, sunflower, pine, corn, olive, peanut, rapeseed, canola, sesame, rice bran, jatropha or mixtures thereof, preferably soybean, cottonseed, castorbean, palm and linseed oils, preferably soybean and cottonseed oils and more preferably soybean oil.

Transesterification of soybean oil with ethanol can be performed with the use of catalysts. In this reaction, a triglyceride reacts with an alcohol in the presence of a strong acid or base. The resulting products are a mixture of glycerol and fatty acids alkyl esters (Chemical reaction 1):

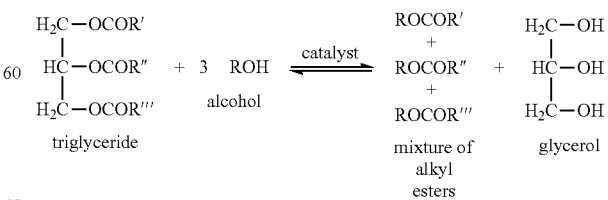

wherein R', R'', R''' represent groups of fatty acid.

As indicated in the reaction above, the process requires 1 mol of triglyceride and 3 moles of alcohol. The complete process involves three consecutive and reversible reactions, forming diglycerides and monoglycerides as intermediate products. The composition of the final product will depend on the reaction conditions, like temperature, stoichiometry (alcohol/triglyceride molar ratio), type of catalyst. After transesterification reaction and removal of glycerol, the composition is: fatty acid ethyl ester, diglyceride, monoglyceride and triglyceride.

Oil composition after transesterification can be determined through Thermogravimetric Analysis (TGA), using TGA equipment model Q50 from TA Instruments, temperature ramp from 50 to 600° C., $N_2$ flow 60 ml/min, sample mass of about 5.0000 mg. Figure 4 shows an illustrative thermogram of a vegetable oil sample after transesterification reaction (mass loss and derivative versus temperature).

Composition of transesterified soybean oil which can be used as extension oil for ESBR in the present invention must comprise: fatty acid ethyl ester, diglyceride and triglyceride, consisting of fatty acid ethyl ester varying from 5 to 60%, diglyceride varying from 40 to 80% and triglyceride varying from 0.01 to 99.9%, preferably consisting of fatty acid ethyl ester varying from 35 to 48%, diglyceride varying from 50 to 75% and triglyceride varying from 0.01 to 50%, more preferably consisting of fatty acid ethyl ester varying from 40 to 44%, diglyceride varying from 56 to 60% and triglyceride varying from 0.01 to 4%.

After transesterification process, soybean oil can also be epoxidized. Epoxidation of transesterified soybean oil occurs in the double bonds of unsaturated compounds in two steps. First, peracetic acid is prepared by the reaction of acetic acid with hydrogen peroxide, represented by Chemical Reaction 2 below.

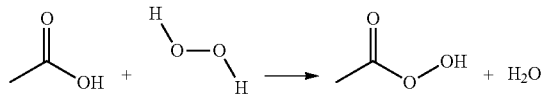

Second step is the reaction of the double bond of the unsaturated ester with peracetic acid to produce epoxidized soybean oil. Chemical Reaction 3 below is an Illustrative example of epoxidation with ethyl linoleate.

Content of oil epoxidation is easily achieved by vegetable oil producers through the control of molar ratio between transesterified oil and peracetic acid. Degree of possible soybean oil epoxidation is between 0.01 to 6.3%. For the use as extension oil in ESBR in the present invention, the degree of epoxidation is between 2.5 to 4.5 and preferably between 3.3 to 3.5%.

The renewable oil used as extension oils for functionalized ESBR of the present invention is extended in the functionalized styrene-butadiene copolymer in amount of 25 to 42 phr, preferably of 37.5 phr.

Functionalized ESBR copolymer extended with functionalized renewable oil of the present invention presents a Mooney viscosity (ML 1+4, 100° C.) of 35 to 65, preferably of 40 to 60.

Compounds for tires with silica and/or carbon black as filler using functionalized ESBR extended with epoxidized soybean oil of the present invention were prepared and vulcanized. Properties like rheometry, tensile test, abrasion, exudation observation, wet grip and rolling resistance were evaluated.

Rubber vulcanized compounds having the functionalized rubber extended with epoxidized renewable oil of the present invention can be used in the industry to prepare general technical articles comprising tires, treads, conveyor belts, shoe soles, piping, carpets, hoses and molded products in general, considering that each producer have specific formulation according the their product specification and application.

Besides solving the exudation problem, the vulcanized compounds mainly with silica as reinforcing filler in compound formulations for tires and technical articles using the functionalized styrene-butadiene-glycidyl methacrylate extended with epoxidized soybean oil of the present invention present superior properties like stress at rupture, tear strength, wear resistance, wet grip and rolling resistance compared to a common ESBR extended with extension oil.

EXAMPLES

The following examples are presented for a better understanding of the present invention and not intended to limit its scope.

Example 1

Preparation of Standard SBR Latex by Emulsion Polymerization

Standard SBR latex was prepared by emulsion polymerization in a 20 liter reactor. First, the reactor was evacuated and then pressurized with nitrogen, repeating this process twice, finishing when the reactor is under vacuum. This procedure is performed to avoid the presence of oxygen in the medium which inhibits the initiation of polymerization reaction. The reactor under vacuum was charged with the following ingredients: water (8,700 g), emulsifier batch with potassium salt of fatty and rosin acids (2,330 g), 1,3-butadiene (3,830 g), styrene (1,486 g), pinane hydroperoxide (2.5 g), activator batch with water, ferrous sulfate, EDTA and sodium formaldehyde sulfoxylate (390 g), t-dodecyl mercaptan (10 g). The batch polymerization was conducted at 7° C. and stopped with n-isopropyl hydroxylamine (15 g) at conversion of 60% (duration of about 7 hours). Standard latex obtained was blended with an emulsion of extension oil (with low levels of polycyclic aromatic compounds). These oils can be: TRAE (Treated Residual Aromatic

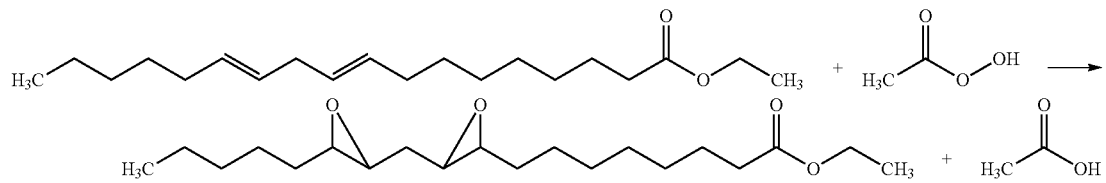

Extract), HN (Heavy Naphthenic), TDAE (Treated Distillate Aromatic Extract), MES (Mild Extraction Solvate). The amount of oil in the dry rubber is 37.5 phr (parts per hundred) of rubber. Emulsion of latex and oil was coagulated in a 20 liter stainless steel vessel with steam heating at 65° C. under mechanical agitation, using coagulant aid and sulfuric acid. Crumbs formed in this process were washed with demineralized water in order to remove residues remaining in the medium such as salts, soaps, etc. These crumbs were placed in a stainless steel sieve with forced air circulation at 65° C. for 18 hours to obtain the dry rubber.

Example 2

Oil-extended copolymer of butadiene-styrene was obtained in the same manner as in Example 1 except for the preparation of a common soybean oil emulsion to blend with the latex and obtain the rubber. The amount of common soybean oil in the dry rubber is 37.5 phr.

Example 3

Oil-extended copolymer of butadiene-styrene was obtained in the same manner as in Example 1 except for the preparation of epoxidized soybean oil emulsion to blend with the latex and obtain the rubber. The amount of epoxidized soybean oil in the dry rubber is 37.5 phr.

Example 4

Preparation of functionalized SBR latex by emulsion polymerization Functionalized SBR latex was prepared by addition of the functional monomer glycidyl methacrylate (GMA) at the beginning of polymerization. Because the amount of GMA in the reaction medium is small, it was prepared separately a blend of GMA in styrene in order to facilitate its diffusion in the medium. A 20 L reactor under vacuum was pressurized with nitrogen, repeating this process twice, finishing when the reactor is under vacuum. This procedure is performed to avoid the presence of oxygen in the medium which inhibits the initiation of polymerization reaction. The reactor under vacuum was charged with the following ingredients: water (8,500 g), emulsifier batch with potassium salt of fatty and rosin acids (2,330 g), batch of buffering system (phosphoric acid 85%: 2.1 g, acetic acid 99%: 5.4 g, potassium hydroxide 50%: 15.3 g, water: 200.0 g, pH=8.7), 1,3-butadiene (3,830 g), styrene (1,242 g), blend of GMA/styrene (106/133 g), pinane hydroperoxide (2.5 g), activator batch with water, ferrous sulfate, EDTA and sodium formaldehyde sulfoxylate (390 g), t-dodecyl mercaptan (10 g). The batch polymerization was conducted at 7° C. and stopped with n-isopropyl hydroxylamine (15 g) at conversion of 60% (polymerization duration of about 5 hours). The pH of final latex is 9.2. Functionalized latex obtained was blended with an emulsion of extension oil (with low levels of polycyclic aromatic compounds). These oils can be: TRAE (Treated Residual Aromatic Extract), HN (Heavy Naphthenic), TDAE (Treated Distillate Aromatic Extract), MES (Mild Extraction Solvate). The amount of oil in the dry rubber is 37.5 phr (parts per hundred) of rubber. Emulsion of latex and oil was coagulated in a 20 liter stainless steel vessel with steam heating at 65° C. under mechanical agitation, using coagulant aid and sulfuric acid. Crumbs formed in this process were washed with demineralized water in order to remove residues remaining in the medium such as salts, soaps, etc. These crumbs were placed in a stainless steel sieve with forced air circulation at 65° C. for 18 hours to obtain the dry rubber.

Example 5

Oil extended functionalized styrene-butadiene copolymer was obtained in the same manner as in Example 4 except for the preparation of common soybean oil emulsion to blend with the latex and obtain the rubber. The amount of common soybean oil in the dry rubber is 37.5 phr.

Example 6

Oil extended functionalized styrene-butadiene copolymer was obtained in the same manner as in Example 4 except for the preparation of epoxidized soybean oil emulsion to blend with the latex and obtain the rubber. The amount of epoxidized soybean oil in the dry rubber is 37.5 phr. Functionalized styrene-butadiene copolymer extended with functionalized soybean oil of the present Example presents the following properties: bound styrene content: 21.0% wt; polybutadiene microstructure: cis-1.4=9.5% wt; trans-1.4=76.3% wt; vinyl 1.2=14.2% wt; Mooney viscosity (ML 1+4, 100° C.): 45.8; average molecular weight (Mw) by GPC (Gel permeation Chromatography): 356,000 g/mol.

Compounds Preparation

The following formulations were used for compounds preparation with carbon black and/or silica (Tables 2 and 3, respectively).

TABLE 2

Composition for compound preparation with carbon black

| Component | *phr |
|---|---|
| Rubber | 96.2 |
| Buna CB 24 (polybutadiene) | 30.0 |
| Carbon black (N-339) | 75.0 |
| Oil (naphthenic, common soybean or epoxidized soybean) | 11.3 |
| Stearic acid | 3.00 |
| Zinc oxide | 3.0 |
| Antioxidant N-1,3-dimethylbutyl-N'-phenyl-p-phenylenediamine (6-PPD) | 2.0 |
| N,N'-difenilguanidina (DPG) | 0.3 |
| N-tert-butyl-2-benzothiazoleslfenamide (TBBS) | 1.3 |
| Sulfur | 2.0 |

*phr: parts per hundred of rubber

TABLE 3

Composition for compound preparation with silica

| Component | phr |
|---|---|
| Rubber | 96.2 |
| Buna CB 24 (polybutadiene) | 30.0 |
| Silica (Zeozil 1165 MP) | 70.0 |
| Zinc oxide | 3.0 |
| Sulfur | 1.6 |
| Stearic acid | 1.0 |
| Carbon Black (N-339) | 5.0 |
| N-tert-butyl-2-benzothiazoleslfenamide (TBBS) | 1.0 |
| Oil (naphthenic, common soybean or epoxidized soybean) | 11.3 |
| Antioxidant N-1,3-dimethylbutyl-N'-phenyl-p-phenylenediamine (6-PPD) | 2.0 |
| Silane (Si 69) | 5.6 |
| N,N'-diphenylguanidine (DPG) | 2.0 |

Tests

Using the unvulcanized rubber composition, the Mooney viscosity after 1 min. (ML1+1/100° C.) and after 4 min.

(ML1+4/100° C.) and the Mooney relaxation after 10 and 30 sec were determined to ASTM D1646 The vulcanization characteristics of the mixtures were studied in a rheometer at 160° C. to DIN 53 529 with the aid of the MDR 2000E Monsanto rheometer. In this way, characteristic data such as $F_{min}$, $F_{max}$, $F_{max}$-$F_{min}$, $t_{10}$, $t_{50}$, $t_{90}$ and $t_{95}$, and also $F_{15\ min}$, $F_{20\ min}$, $F_{25\ min}$ and $F_{25\ min}$-$F_{max}$, were determined.

Definitions according to DIN 53 529, Part 3 are:

$F_{min}$: vulcameter reading at the minimum of the cross-linking isotherm $F_{max}$: vulcameter reading at the maximum of the cross-linking isotherm $F_{max}$-$F_{min}$: difference in the vulcameter readings between maximum and minimum $t_{10}$: time at which 10% of the conversion has been attained
$t_{50}$: time at which 50% of the conversion has been attained
$t_{90}$: time at which 90% of the conversion has been attained
$t_{95}$: time at which 95% of the conversion has been attained The reversion characteristics were characterized by the following parameters:

$F_{15\ min}$: vulcameter reading after 15 min.
$F_{20\ min}$: vulcameter reading after 20 min.
$F_{25\ min}$: vulcameter reading after 25 min.
$F_{25\ min}$-$F_{max}$ difference between the vulcameter reading after 25 min. and the maximum value A rubber composition with good reversion characteristics features a substantially constant vulcameter reading in the course of long vulcanization times; i.e. the change relative to the vulcameter maximum should be at a minimum. What is absolutely undesirable is a decrease in the vulcameter reading with increasing vulcanization times ('reversion'). This is an Indication of poor ageing characteristics of the vulcanizate, with a decrease in the degree of crosslinking or in the modulus during the use time. Equally undesirable is a rise in the vulcameter reading after attainment of the maximum ("marching modulus"). A measure employed for the reversion resistance of the rubber mixtures was the difference in the vulcameter readings between 25 min and the maximum ($F_{25\ min}$-$F_{max}$). In the case of the inventive mixtures, this value is <−0.47 dNm.

The specimens needed for the vulcanizate characterization were produced by press vulcanization of the mixtures at a hydraulic pressure of 120 bar. The vulcanization conditions used for the production of the specimens are stated for the individual test series.

Using the vulcanizates, the following properties were determined to the standards specified:
DIN 53505: Shore A hardness at 23° C. and 70° C.
DIN 53512: Resilience at 23° C. and 70° C. ("R23")
DIN 53504: Stress values at 10%, 25%, 50%, 100%, 200% and 300% strain ($\sigma_{10}$, $\sigma_{25}$, $\sigma_{50}$, $\sigma_{100}$, $\sigma_{200}$ and $\sigma_{300}$), tensile strength and elongation at break
DIN 53516: Abrasion
and
tan δ (60° C.): loss factor (E"/E') at 60° C.
E' gives an indication of the grip of the winter tyre tread on ice and snow. The lower the E', the better the grip.
Tan δ (60° C.) is a measure of the hysteresis loss in the rolling of the tyre. The lower the tan δ (60° C.), the lower the rolling resistance of the tyre.

Tensile strength tests were performed on the obtained vulcanized compounds according to ASTM D 412 (Standard Test Methods for Vulcanized Rubber and Thermoplastic Elastomers—Tension) procedure, Stress Relaxation, and Pre-Vulcanization Characteristics (Mooney Viscometer))

Abrasion was evaluated by DIN method

Glass transition temperature (Tg) was measured by Differential Scanning Calorimetry (DSC) technique and
hardness by Shore A method.

Values of tan delta at 0° C. and 60° C. were measured in the vulcanized compounds by DMA (Dynamic Mechanical Analysis) technique.

Wet grip and rolling resistance are two important properties that a tire must present. Wet grip means security while rolling resistance means fuel economy. Values of tan delta at 0° C. are associated to wet grip and the higher the better while values of tan delta at 60° C. are associated to rolling resistance and the lower the better.

Carbon Black Compounds with Rubbers from Examples 1, 2 and 3

Rubbers from Examples 1, 2 and 3 were used to prepare compounds with carbon black in mini-mixer according to formulation in Table 2. Oils used in the formulation for compounds with carbon black were the same used in the rubber, e.g. naphthenic oil for Example 1, common soybean oil for Example 2 and epoxidized soybean oil for Example 3.

TABLE 4

Results of vulcanizates with carbon black using rubbers from Examples 1, 2 and 3:

| Products | Standard rubber with extension oil (Example 1) | Standard rubber with common soybean oil (Example 2) | Standard rubber with epoxidized soybean oil (Example 3) |
|---|---|---|---|
| Mooney viscosity (Rubber) | | | |
| MML(1 + 4) | 55.3 | 53.0 | 53.8 |
| Stress relaxation (%) | 20.3 | 22.2 | 21.1 |
| Rubber Tg (° C.) | −56.8 | −74.5 | −67.2 |
| Mooney viscosity (Compound) | | | |
| MML(1 + 4) | 78.1 | 61.6 | 62.8 |
| Stress relaxation (%) | 20.0 | 16.5 | 15.7 |
| Rheometry MDR (30'/160° C.) | | | |
| ML (dNm) | 2.5 | 2.6 | 2.7 |
| MH (dNm) | 14.0 | 11.1 | 8.3 |
| tS1 (min.) | 2.2 | 1.9 | 2.2 |
| t50 (min.) | 3.9 | 3.1 | 3.5 |
| t90 (min.) | 7.6 | 5.5 | 6.0 |
| Tensile test | | | |
| Modulus at 300% (kgf/cm2) | 129.9 | 100.3 | 57.3 |
| Stress at rupture (kgf/cm2) | 224.6 | 202.6 | 168.5 |
| Elongation (%) | 417.0 | 526.5 | 653.8 |
| Hardness (shore A) | 61.9 | 56.4 | 49.5 |
| Tear strength (kgf/cm) | 43.8 | 44.5 | 40.4 |
| Resilience (%) | 41.0 | 43.0 | 39.0 |
| Abrasion DIN (mm3) | 43.4 | 52.8 | 56.8 |
| Oil exudation | NO | YES | YES |
| Tan delta at 0° C. | 0.326 | 0.297 | 0.336 |
| Tan delta at 60° C. | 0.213 | 0.195 | 0.224 |

Results of rubber Tg in Table 4 show that standard rubber with epoxidized soybean oil (Example 3) presents a reduction in Tg in comparison to standard rubber with extension oil (Example 1), and this effect is more pronounced with standard rubber with common soybean oil (Example 2).

Exudation (oil migration to the surface of vulcanized) is an important characteristic for a rubber compound. Usually, exudation is observed when oil compatibility with rubber is poor.

Compression set is usually used to verify exudation because it is performed at 75° C., pressure and 3 days of duration. Under these extreme conditions, if the interaction polymer-oil is not effective, exudation will occur.

Vulcanized compound with carbon black prepared using standard rubber of Example 1 did not show oil exudation after compression set as expected whereas vulcanized compounds with carbon black prepared using rubbers of Example 2 (standard rubber with common soybean oil) and Example 3 (standard rubber with epoxidized soybean oil) presented oil exudation.

Results in Table 4 show that modulus, stress at rupture, hardness and abrasion of vulcanized compounds with carbon black from Examples 2 and 3 present inferior performance in comparison with Example 1, although Mooney viscosity of raw rubbers are quite similar.

Results of tan delta at 0° C. and 60° C. in Table 4 show that wet grip and rolling resistance performance for vulcanized compound of Example 3 are similar to Example 1.

Silica Compounds with Rubbers from Examples 1, 2 and 3

Rubbers from Examples 1, 2 and 3 were used to prepare compounds with silica in mini-mixer according to formulation in Table 3. Oils used in the formulation for compounds with silica were the same used in the rubber, e.g. naphthenic oil for Example 1, common soybean oil for Example 2 and epoxidized soybean oil for Example 3. Results are shown in Table 5.

TABLE 5

Results of vulcanizates with silica using rubbers from Examples 1, 2 and 3:

| Products/properties | Standard rubber with extension oil (Example 1) | Standard rubber with common soybean oil (Example 2) | Standard rubber with epoxidized soybean oil (Example 3) |
|---|---|---|---|
| Mooney viscosity (Rubber) | | | |
| MML(1 + 4) | 55.3 | 53.0 | 53.8 |
| Stress relaxation (%) | 20.3 | 22.2 | 21.1 |
| Rubber Tg (° C.) | −56.8 | −74.5 | −67.2 |
| Mooney viscosity (Compound) | | | |
| MML(1 + 4) | 60.5 | 57.9 | 63.0 |
| Stress relaxation (%) | 14.7 | 17.2 | 19.6 |
| Rheometry MDR (30′/160° C.) | | | |
| ML (dNm) | 2.4 | 2.4 | 2.9 |
| MH (dNm) | 17.6 | 14.9 | 14.3 |
| tS1 (min.) | 1.3 | 0.4 | 0.3 |
| t50 (min.) | 3.2 | 3.0 | 3.4 |
| t90 (min.) | 5.6 | 5.4 | 6.0 |
| Tensile test | | | |
| Modulus at 300% (kgf/cm2) | 92.0 | 77.6 | 72.6 |
| Stress at rupture (kgf/cm2) | 211.4 | 209.5 | 207.2 |
| Elongation (%) | 593.1 | 662.9 | 758.6 |
| Hardness (shore A) | 65.1 | 61.7 | 60.9 |
| Tear strength (kgf/cm) | 48.0 | 112.4 | 103.2 |
| Resilience (%) | 42.0 | 50.0 | 46.0 |
| Abrasion DIN (mm3) | 61.6 | 69.1 | 113.5 |
| Oil exudation | NO | NO | NO |
| Tan delta at 0° C. | 0.267 | 0.214 | 0.253 |
| Tan delta at 60° C. | 0.160 | 0.141 | 0.156 |

Vulcanized compound with silica prepared using standard rubber of Example 1 did not show oil exudation after compression set as well as vulcanized compound with silica prepared using standard rubber of Example 2 (with common soybean oil) and standard rubber of Example 3 (with epoxidized soybean oil).

Results of modulus, hardness and abrasion of vulcanized compounds with silica from Example 2 (standard rubber with common soybean oil) and Example 3 (standard rubber with epoxidized soybean oil) presented inferior performance in comparison with Example 1 (standard rubber with extension oil) although Mooney viscosity of raw rubbers are similar.

Wet grip performance for vulcanized compounds of Examples 2 and 3 shown in Table 5 are inferior in relation to Example 1. Comparing rolling resistance performance of Example 1, performance of Example 2 is slightly superior while performance of Example 3 is similar.

Carbon Black Compounds with Rubber from Examples 4, 5 and 6

Rubbers from Examples 4, 5 and 6 were used to prepare compounds with carbon black in mini-mixer according to formulation in Table 2. Oils used in the formulation for compounds with carbon black were the same used in the rubber, e.g. naphthenic oil for Example 4, common soybean oil for Example 5 and epoxidized soybean oil for Example 6. Results are shown in Table 6.

TABLE 6

Results of vulcanizates with carbon black using rubbers from Examples 4, 5 and 6:

| Products/properties | Functionalized rubber with extension oil (Example 4) | Functionalized rubber with common soybean oil (Example 5) | Functionalized rubber with epoxidized soybean oil (Example 6) |
|---|---|---|---|
| Mooney viscosity (Rubber) | | | |
| MML(1 + 4) | 51.7 | 45.1 | 45.8 |
| Stress relaxation (%) | 21.0 | 19.6 | 19.1 |
| Rubber Tg (° C.) | −55.0 | −74.8 | −65.9 |
| Mooney viscosity (Compound) | | | |
| MML(1 + 4) | 73.3 | 67.8 | 67.5 |
| Stress relaxation (%) | 17.5 | 18.2 | 16.5 |
| Rheometry MDR (30′/160° C.) | | | |
| ML (dNm) | 2.6 | 2.7 | 2.6 |
| MH (dNm) | 15.1 | 12.3 | 11.8 |
| tS1 (min.) | 1.8 | 1.9 | 1.8 |
| t50 (min.) | 4.0 | 3.4 | 4.1 |
| t90 (min.) | 7.9 | 6.1 | 9.8 |
| Tensile test | | | |
| Modulus at 300% (kgf/cm2) | 130.7 | 97.1 | 101.9 |
| Stress at rupture (kgf/cm2) | 201.4 | 183.8 | 180.1 |
| Elongation (%) | 432.4 | 506.7 | 558.8 |
| Hardness (shore A) | 61.6 | 57.1 | 62.6 |
| Tear strength (kgf/cm) | 35.3 | 43.0 | 49.4 |
| Resilience (%) | 39.0 | 40 | 43 |
| Abrasion DIN (mm3) | 50.7 | 45.3 | 42.8 |
| Oil exudation | NO | NO | NO |
| Tan delta at 0° C. | 0.341 | 0.304 | 0.337 |
| Tan delta at 60° C. | 0.219 | 0.209 | 0.220 |

Results of rubber Tg in Table 6 show a reduction in Tg for functionalized rubber with common soybean oil of Example 5 (−74.8° C.) compared to functionalized rubber with extension oil of Example 4 (−55.0° C.). However, this reduction is not so pronounced for functionalized rubber with epoxidized soybean oil of Example 6 (−65.9° C.).

Vulcanized compound with carbon black prepared using rubber of Example 4 (functionalized rubber with extension oil) did not show oil exudation after compression set as well as vulcanized compound with carbon black prepared using rubber of Example 5 (functionalized rubber with common soybean oil) and Example 6 (functionalized rubber with common soybean oil).

Results shown in Table 6 of modulus and stress at rupture of vulcanized compounds with silica of Example 5 (functionalized rubber with common soybean oil) and Example 6 (functionalized rubber with epoxidized soybean oil) are inferior in comparison with Example 4 (functionalized rubber with extension oil) because Mooney viscosity of raw rubber are also inferior. Results of hardness of Examples 5 and 6 are quite similar to Example 4. Abrasion results show significant improvement in vulcanized compounds of Examples 5 and 6 compared to Example 4.

Results of tan delta at 0° C. in Table 6 show that wet grip performance for carbon black vulcanized compound of Example 6 is better in relation to Example 5 and similar in relation to Example 4. Rolling resistance performance (tan delta at 60° C.) is similar among Examples 4, 5 and 6.

Silica Compounds with Rubber from Examples 4, 5 and 6

Rubbers from Examples 4, 5 and 6 were used to prepare compounds with silica in mini-mixer according to formulation in Table 3. Oils used in the formulation for compounds with silica were the same used in the rubber, e.g. naphthenic oil for Example 4, common soybean oil for Example 5 and epoxidized soybean oil for Example 6. Results are shown in Table 7.

TABLE 7

Results of vulcanizates with silica using rubbers from Examples 4 and 5:

| Products/properties | Functionalized rubber with extension oil (Example 4) | Functionalized rubber with common soybean oil (Example 5) | Functionalized rubber with epoxidized soybean oil (Example 6) |
|---|---|---|---|
| Mooney viscosity (Rubber) | | | |
| MML(1 + 4) | 51.7 | 45.1 | 45.8 |
| Stress relaxation (%) | 21.0 | 19.6 | 19.1 |
| Rubber Tg (° C.) | −55.0 | −74.8 | −65.9 |
| Mooney viscosity (Compound) | | | |
| MML(1 + 4) | 87.2 | 63.1 | 57.4 |
| Stress relaxation (%) | 25.7 | 17.8 | 16.3 |
| Rheometry MDR (30'/160° C.) | | | |
| ML (dNm) | 2.1 | 2.0 | 1.8 |
| MH (dNm) | 19.9 | 16.3 | 15.7 |
| tS1 (min.) | 1.4 | 0.9 | 1.2 |
| t50 (min.) | 3.2 | 3.0 | 3.1 |
| t90 (min.) | 7.0 | 6.3 | 8.1 |
| Tensile test | | | |
| Modulus at 300% (kgf/cm2) | 126.7 | 93.2 | 96.2 |
| Stress at rupture (kgf/cm2) | 186.6 | 225.0 | 233.3 |
| Elongation (%) | 482.8 | 615.6 | 610.8 |
| Hardness (shore A) | 64.4 | 64.0 | 64.5 |
| Tear strength (kgf/cm) | 51.6 | 102.5 | 112.8 |
| Resilience (%) | 38.0 | 40.0 | 44.0 |
| Abrasion DIN (mm3) | 70.3 | 57.5 | 40.5 |
| Oil exudation | NO | NO | NO |
| Tan delta at 0° C. | 0.275 | 0.248 | 0.292 |
| Tan delta at 60° C. | 0.161 | 0.155 | 0.140 |

Vulcanized compound with silica prepared using rubber of Example 4 (functionalized rubber with extension oil) did not show exudation after compression set as well as vulcanized compound with silica prepared using rubber of Examples 5 (functionalized rubber with common soybean oil) and 6 (functionalized rubber with epoxidized soybean oil).

Results in Table 7 show that modulus for silica vulcanized compounds of Example 5 and 6 (93.2 and 96.2 respectively) are inferior in relation to Example 4 (126.7) because Mooney viscosity of the raw rubber is also Inferior, but in the same level if compared to silica vulcanized compound of standard rubber with extension oil of Example 1 shown in Table 5 (92.0) although Mooney of the raw rubber in this case (Example 1 of Table 5) is higher. Stress at rupture and tear strength of silica vulcanized compound of Example 6 present better performance compared to Examples 4 and 5 and also if compared to silica vulcanized compound of Example 1 (standard rubber with extension oil) in Table 5.

Other important properties for tire composition are abrasion, tan delta at 0° C. and tan delta at 60° C. which mean wear resistance (durability), wet grip (security) and rolling resistance (fuel economy), respectively. Results of these 3 properties in Table 7 for silica vulcanized compound of Example 6 (functionalized rubber with 6 epoxidized soybean oil) present better performance in comparison with silica vulcanized compounds of Examples 4 and 5 and also if compared to silica vulcanized compound of Example 1 (standard rubber with extension oil) in Table 5.

Improvement in the mentioned properties for the silica vulcanized compound of Example 6 is an indication of good interaction polymer-oil when both of them are functionalized, which Is the product functionalized rubber extended with functionalized renewable oil of the present invention.

What is claimed is:

1. An oil extended, functionalized styrene-butadiene copolymer comprising:
   functionalized styrene-butadiene copolymer comprising 15 to 50 wt. % of repeating units based on styrene, 42 to 80 wt. % of repeating units based on butadiene, and 5 to 43 wt. % of units based on at least one functional monomer; and
   at least one extender oil comprising a transesterified vegetable oil, wherein the extender oil comprises a mixture of 35 to 48 wt. % fatty acid ethyl ester, 50 to 75 wt. % diglyceride, and 0.01 to 50 wt. % triglyceride, based on 100 wt. % of the mixture.

2. The oil extended functionalized styrene-butadiene copolymer according to claim 1, wherein the functionalized copolymer is a functionalized terpolymer comprising the functional monomer is polymerized with the units based on styrene and the units based on butadiene.

3. The oil extended functionalized styrene-butadiene copolymer according to claim 2, wherein the functionalized copolymer comprises 0.3 to 10 wt. % of the units based on the functional monomer.

4. The oil extended functionalized styrene-butadiene copolymer according to claim 3, wherein the functionalized copolymer has a Mooney viscosity (ML 1+4 at 100° C.) of 35 to 65, and an average molecular weight (Mw) of 100,000 to 2,200,000 g/mol.

5. The oil extended functionalized styrene-butadiene copolymer according to claim 1, wherein the functionalized copolymer comprises the functional monomer grafted to the copolymer.

6. The oil extended functionalized styrene-butadiene copolymer according to claim 1, wherein the functional monomer comprises an acrylate based monomer.

7. The oil extended functionalized styrene-butadiene copolymer according to claim 1, wherein the transesterified vegetable oil is a transesterified oil derived from an oil selected from the group consisting of soybean, cottonseed, castorbean, palm, linseed, coconut, sunflower, pine, corn, olive, peanut, rapeseed, canola, sesame, rice bran, jatropha oils and mixtures thereof.

8. The oil extended functionalized styrene-butadiene copolymer according to claim 7, comprising 25 to 42 phr of the extender oil.

9. A process for producing the oil extended functionalized styrene-butadiene copolymer according to claim 1, the process comprising:
(1) producing the functionalized styrene-butadiene copolymer by at least one of:
(1a) emulsion polymerization of the units based on styrene, the units based on butadiene and the functional monomer using a buffering system and controlling the pH in the range of 8.5 to 9.5, wherein the buffering system is selected from the group consisting of disodium hydrogen phthalate/sodium dihydrogen orthophosphate, acetic acid/sodium acetate, boric acid/sodium tetraborate, sodium phosphate disubstituted sodium hydroxide, monosodium phosphate/phosphoric acid, potassium dihydrogen orthophosphate/sodium hydroxide, disodium phosphate/phosphoric acid, monosodium phosphate/sodium hydroxide, boric acid/sodium hydroxide, dipotassium hydrogen phtalate/potassium dihydrogen orthophosphate, potassium dihydrogen orthophosphate/sodium hydroxide, sodium tetraborate/hydrochloric acid, sodium carbonate/sodium hydrogen carbonate, disodium phosphate/phosphoric acid, potassium phosphate/potassium hydroxide, sodium tetraborate/sodium hydroxide, sodium bicarbonate/sodium hydroxide, sodium hydrogen orthophosphate/sodium hydroxide, and potassium chloride/sodium hydroxide, or
(1b) grafting a styrene-butadiene copolymer obtained by emulsion polymerization of the units based on styrene and the units based on butadiene with the functional monomer, or
(1c) directly functionalizing the polymeric chain of an Emulsion Styrene-Butadiene Rubber with epoxide groups, and
(2) blending the functionalized styrene-butadiene copolymer obtained by (1a), (1b) and/or (1c) with the at least one extender oil.

10. The process according to claim 9, wherein the functional monomer comprises an acrylate based monomer.

11. The process according to claim 9, wherein the transesterified vegetable oil is a transesterified oil derived from an oil selected from the group consisting of soybean, cottonseed, castorbean, palm, linseed, coconut, sunflower, pine, corn, olive, peanut, rapeseed, canola, sesame, rice bran, jatropha and mixtures thereof.

12. The process according to claim 11, wherein the transesterified vegetable oil comprises epoxidized oil having a degree of epoxidation of 2.5 to 4.5%.

13. A rubber composition comprising the oil extended functionalized styrene-butadiene copolymer according to claim 1 and at least one carbon black and/or at least one silica.

14. The oil extended functionalized styrene-butadiene copolymer according to claim 1, wherein:

the oil extended functionalized styrene-butadiene copolymer comprises 25 to 42 phr of the extender oil; and
the transesterified vegetable oil is a transesterified oil derived from an oil selected from the group consisting of soybean, cottonseed, castorbean, palm, linseed, coconut, sunflower, pine, corn, olive, peanut, rapeseed, canola, sesame, rice bran, jatropha oils and mixtures thereof.

15. The oil extended functionalized styrene-butadiene copolymer according to claim 14, wherein:
the functionalized copolymer is a functionalized terpolymer comprising the functional monomer polymerized with the units based on styrene and the units based on butadiene;
the functionalized copolymer comprises 0.3 to 10 wt. % of the units based on the functional monomer;
the functionalized copolymer has a Mooney viscosity (ML 1+4 at 100° C.) of 35 to 65, and an average molecular weight (Mw) of 100,000 to 2,200,000 g/mol;
the functional monomer comprises an acrylate based monomer; and
the extender oil comprises a mixture of 40 to 44 wt. % fatty acid ethyl ester, 56 to 60 wt. % diglyceride, and 0.01 to 4 wt. % triglyceride, based on 100 wt. % of the mixture.

16. The oil extended functionalized styrene-butadiene copolymer according to claim 15, wherein:
the functionalized copolymer comprises 0.7 to 3.5 wt. %, of the units based on the functional monomer;
the functionalized copolymer has a Mooney viscosity (ML 1+4 at 100° C.) of 40 to 60, and an average molecular weight (Mw) of 200,000 to 900,000 g/mol;
the functional monomer is an acrylate based monomer selected from the group consisting of glycidyl methacrylate, glycidyl acrylate, hydroxypopyl methacrylate, hydroxyethyl methacrylate, acrylonitrile, methacryimpropyltrimethoxysilane, methacryloxypropyltrisopropoxysilane, methacryloxysilane, and mixtures thereof;
the oil extended functionalized styrene-butadiene copolymer comprises 375 phr of the extender oil; and
the extender oil comprises epoxidized oil having a degree of epoxidation of 3.3 to 3.5%.

17. The process according to claim 16, wherein:
the functional monomer is selected from the group consisting of glycidyl methacrylate, glycidyl acrylate, hydroxypopyl methacrylate, hydroxyethyl methacrylate, methacryloxypropyltrimethoxysilane, methacryloxypropyltriisopropoxysilane, methacryloxysilane, and mixtures thereof;
the extender oil comprises 40 to 44 wt. % fatty acid ethyl ester, 56 to 60 wt. % diglyceride, and 0.01 to 4 wt. % triglyceride, based on 100 wt. % of the mixture;
the transesterified vegetable oil is a transesterified oil derived from an oil selected from the group consisting of soybean, cottonseed, castorbean, palm, linseed, coconut, sunflower, pine, corn, olive, peanut, rapeseed, canola, sesame, rice bran, jatropha and mixtures thereof; and
extender oil comprises epoxidized oil having a degree of epoxidation of 3.3 to 3.5%.

* * * * *